(12) United States Patent
Van Den Handel, Jr. et al.

(10) Patent No.: US 10,089,336 B2
(45) Date of Patent: Oct. 2, 2018

(54) COLLECTION FREQUENCY BASED DATA MODEL

(71) Applicant: ORACLE INTERNATIONAL CORPORATION, Redwood Shores, CA (US)

(72) Inventors: Wayne A. Van Den Handel, Jr., Windermere, FL (US); Sri Tunuguntla, Ashburn, VA (US); Jay Talreja, Ashburn, VA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 626 days.

(21) Appl. No.: 14/578,676

(22) Filed: Dec. 22, 2014

(65) Prior Publication Data

US 2016/0179854 A1    Jun. 23, 2016

(51) Int. Cl.
G06F 7/00      (2006.01)
G06F 17/30     (2006.01)

(52) U.S. Cl.
CPC .............................. G06F 17/30312 (2013.01)

(58) Field of Classification Search
CPC ......... G06F 17/30312; G06F 17/30315; G06F 17/30353; G06F 17/30997
See application file for complete search history.

(56) References Cited

U.S. PATENT DOCUMENTS

| | | | | |
|---|---|---|---|---|
| 5,642,518 A * | 6/1997 | Kiyama | ............ | G06F 17/30719 704/10 |
| 7,743,136 B1 * | 6/2010 | Ahluwalia | .............. | H04L 12/00 709/224 |
| 9,876,766 B2 * | 1/2018 | Ukena | ................. | H04L 63/0421 |
| 9,898,513 B2 * | 2/2018 | McGregor | ............. | G16H 50/70 |
| 2002/0183972 A1 * | 12/2002 | Enck | .................... | G06F 11/3409 702/186 |
| 2003/0033333 A1 * | 2/2003 | Nishino | ............ | G06F 17/30884 715/255 |
| 2003/0041072 A1 * | 2/2003 | Segal | .................. | G06F 17/3061 |
| 2003/0088579 A1 * | 5/2003 | Brown | ............. | G06F 17/30595 |
| 2004/0117393 A1 * | 6/2004 | DeMesa | ................ | G06Q 30/02 |
| 2004/0243555 A1 * | 12/2004 | Bolsius | ............. | G06F 17/30471 |
| 2010/0146299 A1 * | 6/2010 | Swaminathan | ... | G06F 17/30666 713/189 |
| 2011/0222373 A1 * | 9/2011 | Lee | ........................... | G01S 5/18 367/124 |
| 2013/0212129 A1 * | 8/2013 | Lawson | ............. | G05B 19/4185 707/779 |
| 2015/0095381 A1 * | 4/2015 | Chen | ................. | G06F 17/30091 707/803 |

* cited by examiner

*Primary Examiner* — Hasanul Mobin (74) *Attorney, Agent, or Firm* — Cooper Legal Group, LLC (57) ABSTRACT

Systems, methods, and other embodiments associated with facilitating collection frequency based storage and processing of metric data are described. In one embodiment, a method includes identifying a fact, where the fact corresponds to a given attribute of a given point type and determining a collection frequency with data corresponding to a value of the given attribute for a point of the given point type is collected. The method includes creating a sample table for storing the data, where the sample table records a point identifier, the data, and a collection time for the data. At least one aspect of the sample table is determined based on the collection frequency. The method includes storing subsequently received data in the sample table.

13 Claims, 7 Drawing Sheets

Point Table

| Point ID | Point Type | Point Name | Point Description |
|---|---|---|---|
| Met001 | Meter | A_0_SW | BLDG A Basement SW corner |
| Met002 | Meter | A_0_NW | BLDG A Basement NWcorner |
| Met003 | Meter | A_0_SE | BLDG A Basement SW corner |
| ... | ... | ... | ... |
| Met199 | Meter | K_9_Col5 | BLDG A 9th Floor Column 5 |

Fact Table

| Fact ID | Point Type | Fact Type | Time Basis | Fact Cat | Fact Name | Fact Description |
|---|---|---|---|---|---|---|
| MTR_DAY_RR | Meter | Metric | Daily | Series | Register Read Collection | Daily Register Meter Read Collection |
| MTR_AMP | Meter | Numeric Attribute | NA | Static | Meter Amp Rating | Meter Ampere Rating |
| ... | ... | ... | ... | ... | ... | ... |
| MTR_WK_VOLT | Meter | Interval Text | Hourly | Interval | Meter Voltage | Hourly Meter Voltage |

SAMPLE TABLE
Fact ID: MTR_AMP
Partition: None
Query: Ad Hoc

| Point ID | StartTime | EndTime | Value |
|---|---|---|---|
| Met001 | 1/1/02 | 8/30/12 | 50.0 |
| Met001 | 8/30/12 | 1/1/2050 | 75.0 |
| ... | ... | ... | ... |
| Met198 | 1/9/14 | 1/1/2050 | 100.0 |
| Met199 | 1/16/14 | 1/1/2050 | 50.0 |

SAMPLE TABLE
Fact ID: MTR_WK_VOLT
Partition: Daily
Query: None

| Point ID | Time | Value |
|---|---|---|
| Met001 | 1/1/02 0:00 | 235 |
| Met001 | 1/1/02 1:00 | 242 |
| ... | ... | ... |
| Met199 | 12/13/24 15:00 | 119 |

SAMPLE TABLE
Fact ID: MTR_DAY_RR
Partition: Weekly
Query: Limited Ad Hoc

| Point ID | Time | Value |
|---|---|---|
| Met001 | 1/14/14 | 5728 |
| Met001 | 1/15/14 | 5810 |
| ... | ... | ... |
| Met199 | 1/9/14 | 6157 |
| Met199 | 1/10/14 | 6206 |

COLLECTION FREQUENCY BASED DATA MODEL

BACKGROUND

Many computing systems process large quantities of metric data. Metric data is data that corresponds to a measurement of an attribute (e.g., voltage, response time, status, and so on) of an entity (e.g., line transformer, database server, printer, and so on). Metric data may be received from sensors in a utility system, processors in a computer network, and so on. Storing and managing the ever increasing amount of metric data has become a significant challenge in many computing environments.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Many computer systems that store, manage, and derive value from metric data utilize purpose-specific, custom designed data models that are tailored to specific aspects of the metric data and computer system. Often a trade-off between flexibility, processing speed, and/or scalability must be made in designing a data model for storing metric data.

One characteristic of metric data that makes storage and processing so challenging is the significant variation in collection frequency for the various metrics. For example, a given entity in a system has many different attributes or characteristics that might be sources for metric data. Some attributes change very rarely, if ever, such as serial number, status, installation location, functional capability, and so on. Metrics for slowly changing attributes may not be collected on a regular basis and data for the metrics may only be generated when a change occurs in an attribute. Other more variable attributes correspond to operating parameters and may change fairly rapidly in the daily operation of a measured entity. Such metrics include measures of output, temperature, and other qualitative performance-based metrics. Metrics for more variable attributes are typically collected on a regular basis. However, even metrics that are collected on a regular basis may have vastly different collection frequencies. Consider the difference in the quantity of data generated for a metric that is collected monthly and another metric that is collected every minute.

Different metrics produce different quantities of data based on their collection frequency. The quantity of data being processed for a metric is a major factor in efficiently storing and accessing the data. Thus, it is not efficient to store and process metric data for slow changing attributes that produce relatively little data in the same manner as metric data that is collected on a regular basis. Likewise, it is not efficient to store and process metric data that is collected every minute in the same manner as metric data that is collected only monthly.

For example, it may not be beneficial to partition a table that stores values for a serial number attribute, because such an attribute will not generate large quantities of data. However, due to the relatively static nature of the serial number metric data, it may be feasible to construct indexes and other data structures that support efficient ad hoc querying of the serial number metric data. On the other hand, it may be necessary to partition tables storing power output metric data that is collected every minute due to the sheer volume of data, while it may not be feasible to construct indexes and other data structures that facilitate ad hoc querying of the power output metric data.

Systems and methods are described herein that provide a collection frequency based data model for metric data. The systems and methods described herein are based on a recognition of the differences in optimal storage and processing techniques for metric data having different collection frequencies. The data model is structured enough to store large volumes of metric data and to be able to access, process, and analyze the metric data quickly.

Figure 1:
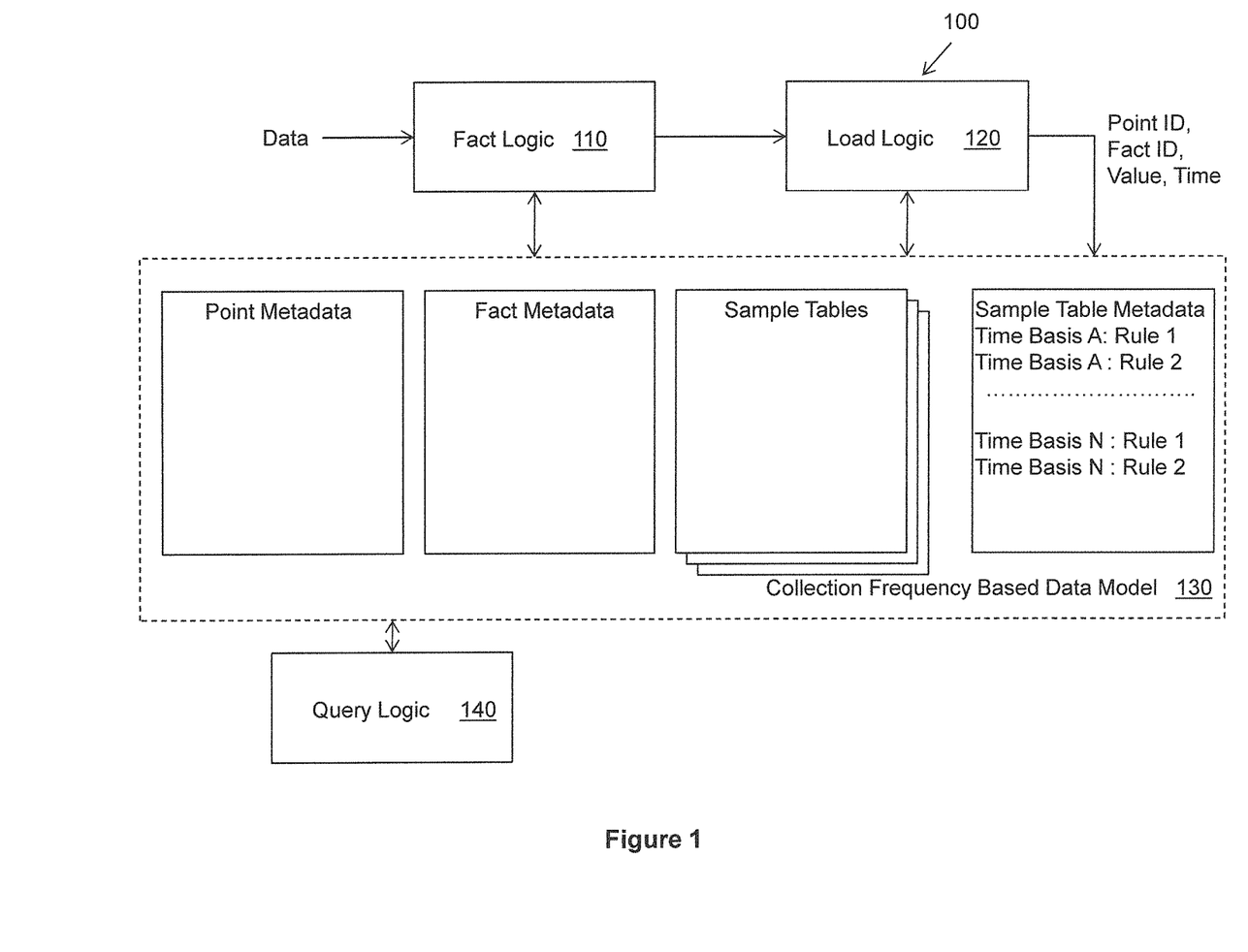
FIG. 1 illustrates one embodiment of a system associated with a collection frequency based data model.

With reference to FIG. 1, one embodiment of a system 100 associated with a collection frequency based data model 130 is illustrated. The system 100 includes fact logic 110, load logic 120, and query logic 140 that each function according to and/or interact with the data model 130. The data model 130 includes a point table, a fact table, sample tables, and sample table metadata or rules. The data model 130 is built around a generic point/fact metaphor and is metadata driven. The point table stores data that describes each point. Points are first class "citizens" that can correspond to any entity about which data can be stored. Points can be physical components like meters and factories, people, geographic locations like a zip code, and even attribute values that are often aggregated such as status (e.g., active, inactive, removed).

The fact table stores data that describes, by fact identifier, each fact for which data is stored in a sample table. Information included in the fact table includes a fact ID, a fact description, a time basis or collection frequency for the fact, and so on. As already discussed above, different facts have a different time basis according to which the underlying data is collected (e.g., weekly, daily, and so on). In the fact table, the different time bases are categorized into one of three types: i) static for slow changing data that is not regularly collected, ii) series for data that is collected on a regular basis no more than once a day, and iii) interval for data that is collected on a regular basis more than once a day.

Figure 5:
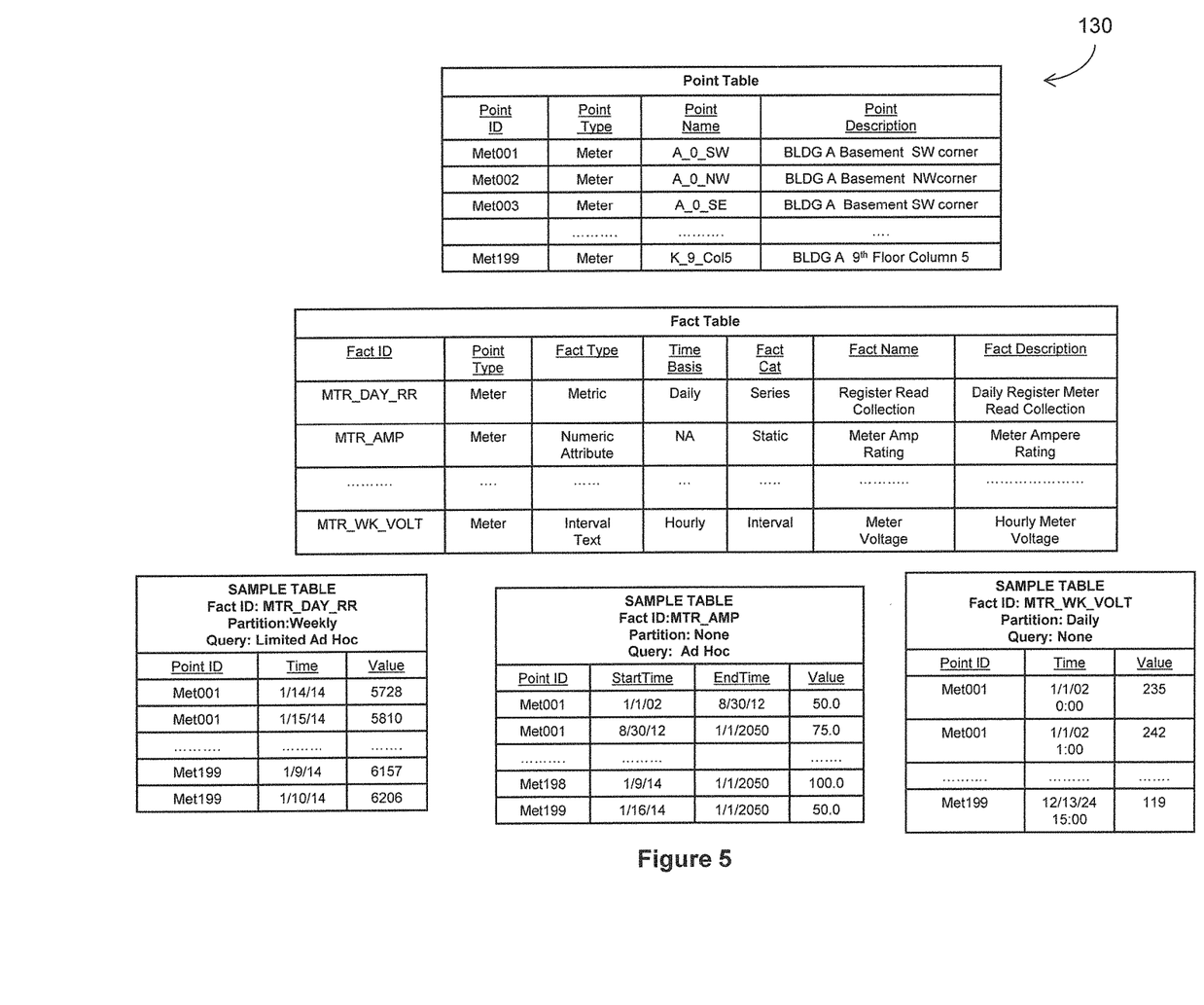
FIG. 5 illustrates a set of populated tables constructed in accordance with one embodiment of the collection frequency based data model.

All metric data is stored in sample tables as facts associated with points at a given time. A fact is a value for a given attribute of a point at a given time (e.g., 5V for meter A at 2:00 PM). Point/Fact/Time "stars" are the basis of the data model's structure. One embodiment of a Point/Fact/Time star data structure for the data model 130 is illustrated in FIG. 5. Sample tables that store facts have certain properties (e.g., partitioning scheme, query support) that are set based on the time basis of the facts they store. Thus, the collection frequency of the facts in the sample table affects how the table is stored and accessed.

In the data model 130, each sample table stores facts having the same point type and fact identifier (e.g., point type: meter and fact identifier: voltage). Data is stored separately in individual sample tables to promote efficient storage and time basis oriented data retrieval. This separation of metric data for individual fact identifiers and point types into individual sample tables facilitates efficiently organizing the manner in which metric data is inserted into the sample table. The entries are organized first by point identifier and then by collection time within each point identifier.

The data model 130 includes sample table metadata that specifies various aspects of the the sample table that will store facts having a given collection frequency. For example, sample tables for static type facts (or no time basis) include columns for a start time and an end time, which is deduced at query time. Sample tables storing series or interval type facts are stored as of a consistent time frame and include a single column that records the collection time (as opposed to two columns for start and end times). The data model is capable of storing text values, numeric values, and counts (integers) for any time basis. To facilitate fast processing, scalability, and storage, the sample tables have only a few columns that simply store the point identifier, the time, and the value. In one embodiment, time is stored as epoch time or seconds since Jan. 1, 1970 UTC.

The sample table metadata defines the granularity of the time that is stored in each sample table's time column. The sample table metadata also controls how end dates for records are determined, how data is loaded into the sample table, a level of partitioning for the table, and the types of queries that are supported on the table. For static fact types, the end date is inferred as the read date of the data in the sample table. The sample table metadata specifies whether secondary value based indexes are constructed for a sample table to enable ad hoc querying is supported. For example, the sample table metadata specifies that sample tables for static fact types are not partitioned while sample tables for series and interval fact types are partitioned based on the time basis for the sample table. For series and interval fact types, the end date is derived from the time basis of the fact. Secondary value based indexes are not supported.

The fact types that are classified as having a static (slow changing) collection frequency are Attribute, Numeric Attribute, and Relation. The Attribute fact type is for textual facts that are slowly changing. The Numeric Attribute fact type is for slowly changing numeric data. The Relation fact type is for facts that map a point of one point type to a point of another point type. The Relation fact type enables facts to be created that connect various types of points in the data model to one another. Relation type facts make it possible to traverse the data model through related points. Relation type facts provide a foreign key like mechanism to link the data in the data model.

Figure 2:
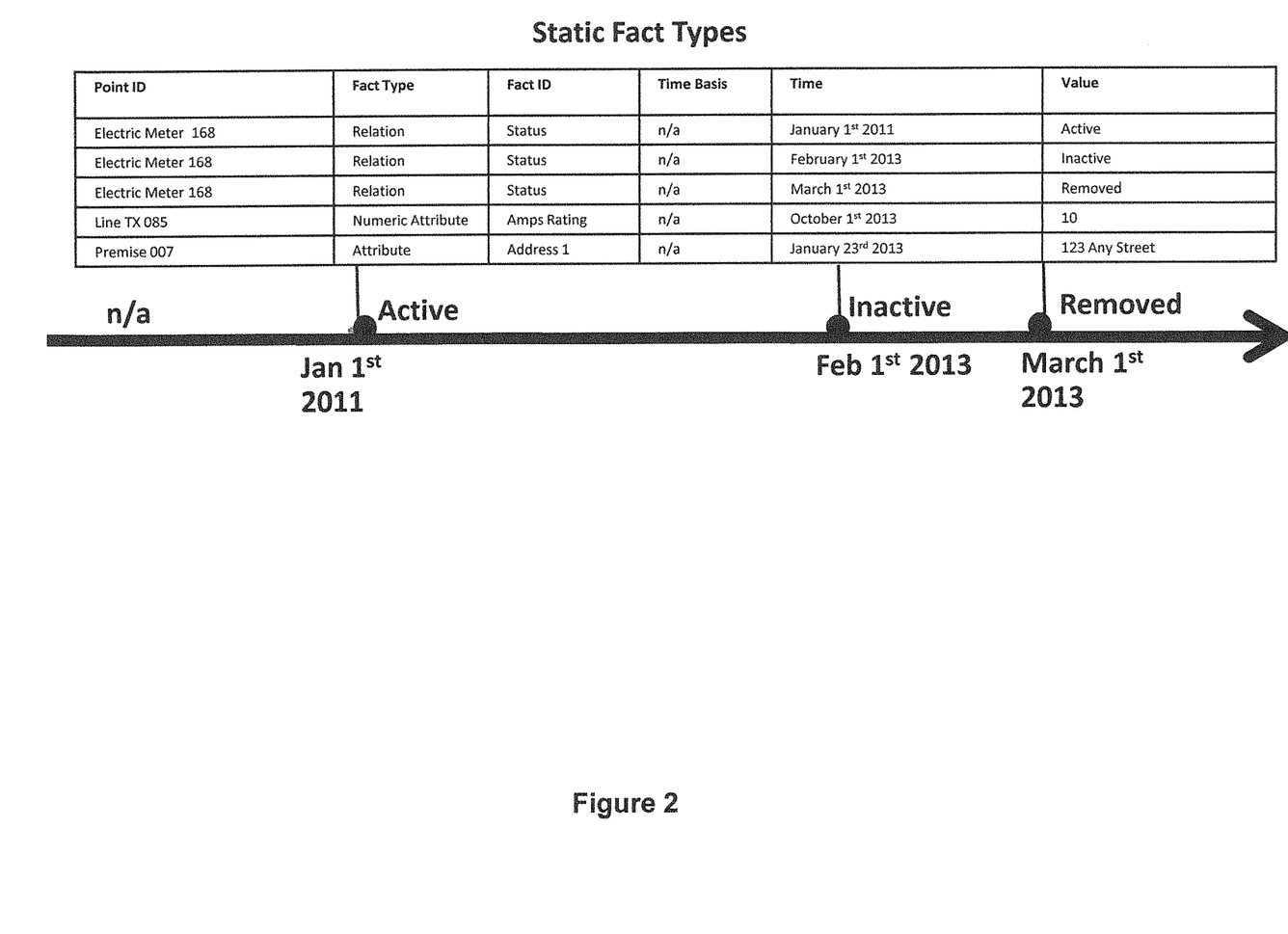
FIG. 2 illustrates how static type facts are stored in one embodiment of the collection frequency based data model.

An example of how static fact types store data is illustrated in FIG. 2. A table is shown that has rows corresponding to individual facts. In one embodiment, the actual sample table may not have columns for each column in the table in FIGS. 2-4. For example, the sample table may store only facts having the same fact identifier, time basis, and fact type. In this case the sample table could include the fact identifier in the sample table's name and as such would not record the fact identifier, the time basis, or fact type in a column. See FIG. 5 for an example sample table.

The timeline at the bottom of FIG. 2 illustrates the status of a point "Electric Meter 168." Electric Meter 168 is made active on Jan. 1, 2011. The first row in the table shows the fact for this change in status. The fact includes the point identifier, the fact type "relation", the fact identifier "status", the effective time "January 1, 2011", and the value of the fact "active." Since fact type "Relation" is classified as having a static collection frequency, data is stored as of an effective time and no time basis is associated with the fact. Subsequent status changes of Electric Meter 168 to inactive and removed are shown as facts in the second and third rows, respectively, of the table. In one embodiment, the facts in the first three rows would be stored in a single sample table that stores only facts having the point type:meter and the fact identifier:status. The sample table may have a table name that includes "meter" and "status."

The fourth row of the table shows a Numeric Attribute fact type that records, for point identifier:line transformer 085, a value of 10 for fact identifier:ampere rating that is recorded on Oct. 1, 2013. In one embodiment, the fact in the fourth row would be stored in a sample table that stores only facts having the point type:line transformer and the fact identifier:ampere rating. The sample table may have a table name that includes "line transformer" and "ampere rating."

The fifth row of the table shows an Attribute fact type that records, for point identifier:premise 007, a value of 123 Any Street for fact identifier:address 1 that is recorded on Jan. 23, 2013. In one embodiment, the fact in the fifth row would be stored in a sample table that stores only facts having the point type:premise and the fact identifier:address 1. The sample table may have a table name that includes "premise" and "address 1."

Figure 3:
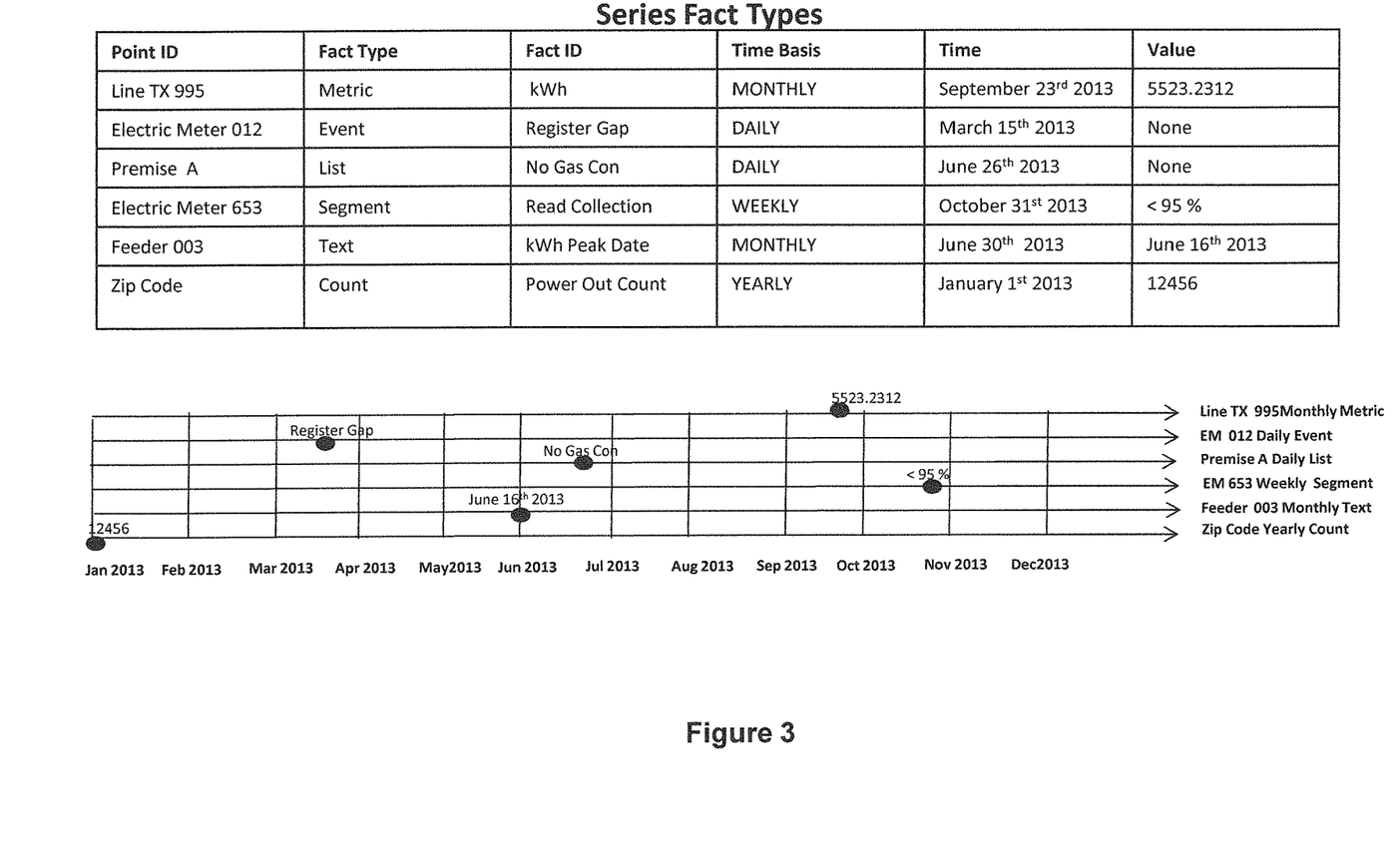
FIG. 3 illustrates how series type facts are stored in one embodiment of the collection frequency based data model.

Referring now to FIG. 3, there are six fact types that are classified as having a "series" collection frequency: Metric, Event, List, Segment, Text, and Count. The Metric fact type is for metric or numeric data stored on a recurring time basis no more often than once a day. The Event fact type is for facts that record that an event occurred. The List fact type is for a fact that identifies a point as belonging on a list (e.g., classifies the point as having membership in some class). Event and List fact types will not have a value, but rather just a point identifier, a fact identifier, and a time. The Segment fact type is for relation type data that has a recurring time frame. The Text fact type is for text data stored on a recurring time basis no more often than once a day. The Count fact type is for facts that record an integer count in a time series occurring on a regular basis.

An example of how series fact types store data is illustrated in FIG. 3. The top timeline illustrates a monthly reading of the power output (kWh) of a point identifier "Line Transformer 995." The reading is taken on Sep. 23, 2013. The first row in the table shows the fact for this monthly line transformer power reading. The fact includes the point identifier for the line transformer, the fact type "metric", the fact identifier "kWh", the time basis "monthly", the time "September 23, 2013", and the value of the fact "5523.2312." In one embodiment, the fact in the first row would be stored in a sample table that stores only facts having the point type:line transformer and the fact identifier: kWh. The sample table may have a table name that includes "line transformer" and "kWh."

The second timeline illustrates data for a daily check on whether a register gap exists for a point "Electric Meter 012." The check is done on Mar. 15, 2013. The second row in the table shows the fact for this daily register check. The fact includes the point identifier for the electric meter, the fact type "event", the fact identifier "Register Gap", the time basis "daily", the time "March 15, 2013", and the value of the fact "None." Note the difference in the format between the values of the metric type fact and the event type fact. Different sample tables will store facts having different fact types and thus can include storage rules that define proper values and formats for values. In one embodiment, the fact in the second row would be stored in a sample table that stores only facts having the point type:electric meter and the fact identifier: register gap. The sample table name may include "electric meter" and "register gap."

The third timeline illustrates data for a daily check that determined that a point "Premise A" does not belong on a daily list of premises without a gas connection. The check is done on Jun. 26, 2013. The third row in the table shows the fact for this daily gas connection check. The fact includes the point identifier for the premise, the fact type "list", the fact identifier "No Gas Connection", the time basis "daily", the time "June 26, 2013", and the value of the fact "None." In one embodiment, the fact in the third row would be stored in a sample table that stores only facts having the point type:premise and the fact identifier:no gas connection. The sample table name may include "premise" and "no gas connection."

The fourth timeline illustrates data for a weekly check that determined that a point "Electric Meter 655" has a read collection of less than 95%. The check is done on Oct. 31, 2013. The fourth row in the table shows the fact for this weekly read collection check. The fact includes the point identifier for the electric meter, the fact type "segment", the fact identifier "Read Collection", the time basis "weekly", the time "October 31, 2013", and the value of the fact "<95%." Since the fact is a segment type fact, the value <95% is also a point itself. This allows a count to made as to how many points have monthly read collection <95% at any given time. In one embodiment, the fact in the fourth row would be stored in a sample table that stores only facts having the point type:electric meter and the fact identifier: read collection facts. The sample table name may include "electric meter" and "read collection."

The fifth timeline illustrates a monthly reading of the peak kilowatt date for a point identifier "Feeder 003" which determined that the peak kilowatt date was Jun. 16, 2013. The reading is taken on Jun. 30, 2013. The fifth row in the table shows the fact for this monthly peak kilowatt date reading. The fact includes the point identifier for the feeder, the fact type "text", the fact identifier "kWh peak date", the time basis "monthly", the time "June 1, 2013", and the value of the fact "June 16, 2013." In one embodiment, the fact in the fifth row would be stored in a sample table that stores only facts having the point type:feeder and the fact identifier:peak kilowatt date facts. The table name may include "feeder" and "peak kilowatt date."

The sixth timeline illustrates that zip code 12456 should be counted in a yearly count of zip codes that lost power at some time in the previous year. The reading is taken on Jan. 1, 2013. The sixth row in the table shows the fact for this yearly power outage count. The fact includes the point identifier "zip code", the fact type "count", the fact identifier "power out count", the time basis "yearly", the time "January 1, 2013", and the value of the fact "12456." In one embodiment, the fact in the sixth row would be stored in a sample table that stores only facts having the point type:zip code and the fact identifier:power outage count. The table name may include "zip code" and "power outage count."

Figure 4:
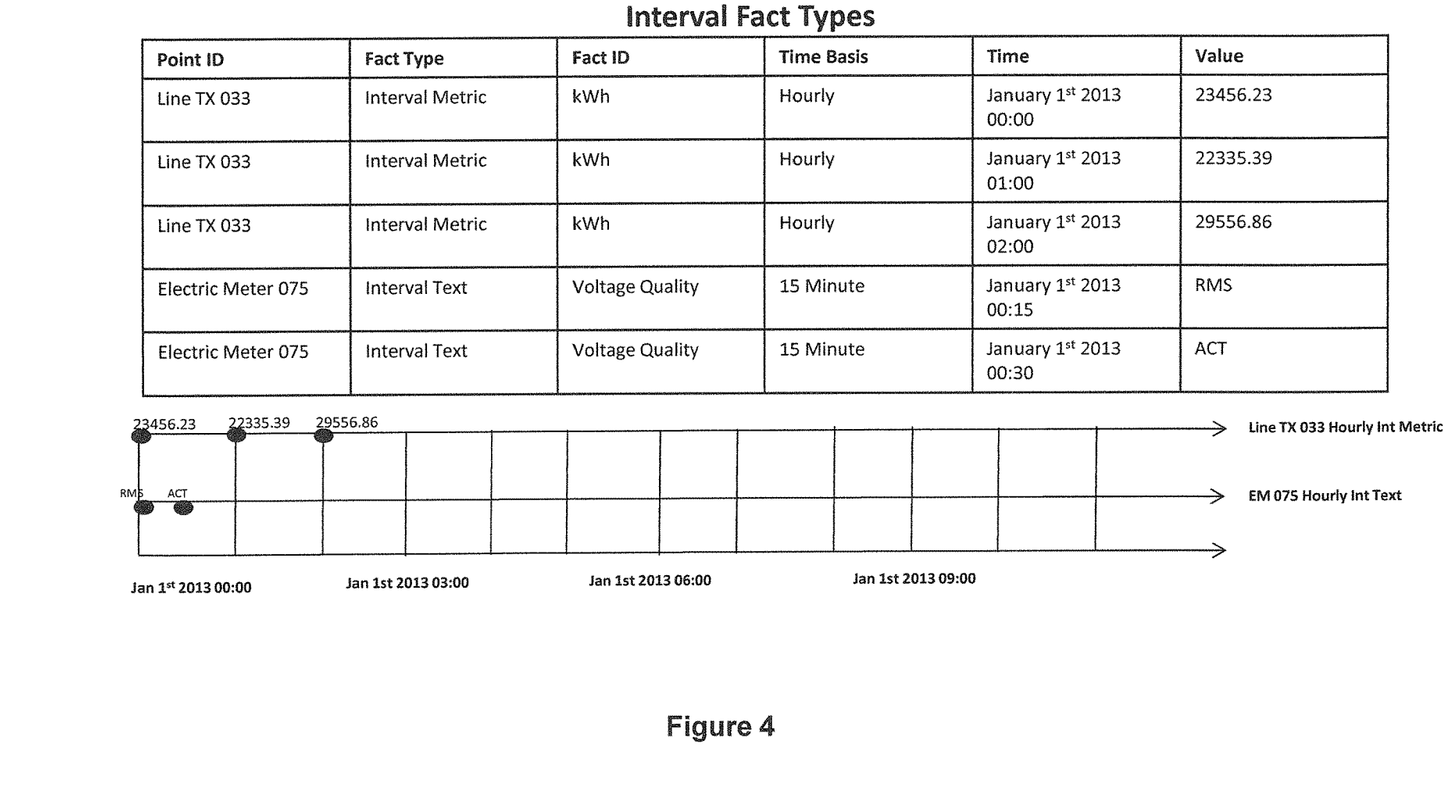
FIG. 4 illustrates how interval type facts are stored in one embodiment of the collection frequency based data model.

Referring to FIG. 4, there are two fact types that are classified as having an "interval" (very frequent) collection frequency: Interval Metric and Interval Text. The Interval Metric fact type is for metric or numeric data stored on a recurring time basis more frequently than once a day. The Interval Text fact type is for text data stored on a recurring time basis more frequently than once a day.

An example of how series fact types store data is illustrated in FIG. 4 The top timeline illustrates a series of three hourly readings of the power output (kWh) of a point identifier "Line Transformer 033." The readings are taken at 00:00, 01:00, and 02:00, respectively on Jan. 1, 2013. The first three rows in the table show the facts for these hourly transformer power readings. The facts includes the point identifier for the line transformer, the fact type "interval metric", the fact identifier "kWh", the time basis "hourly", the times on Jan. 1, 2013, and the values of the fact "23456.23., "22335.39", and 29556.86." In one embodiment, the facts in the first three rows would be stored in a single sample table that stores only facts having the point type:line transformer and the fact identifier:kWh. The table name may include "line transformer" and "kWh."

The second timeline illustrates two readings of the voltage quality for a point identifier "Electric Meter 075" taken on January 1 at 00:15 and 00:30. The reading at 00:15 determined that the voltage quality was "RMS." The reading at 00:30 determined that the voltage quality was "ACT." The fourth and fifth rows in the table show the facts for these voltage quality readings. The facts include the point identifier for the electric meter, the fact type "interval text", the fact identifier "voltage quality", the time basis "hourly", the times on Jan. 1, 2013, and the value of the facts "RMS" and "ACT", respectively. In one embodiment, the facts in the fourth and fifth rows would be stored in a single sample table that stores only facts having the point type:electric meter and the fact identifier:voltage quality. The table name may include "line electric meter" and "voltage quality."

Returning to FIG. 1, the fact logic 110 receives metric data and outputs facts that comply with constraints in the various sample tables of the data model 130. For example, the fact logic 110 ensures that data for a series fact that is numeric and is collected on a certain time basis has a numeric value and occurs at the proper time. The load logic 120 loads facts into the appropriate sample table. The load logic 120 selects a sample table based on the point and fact identifier in the fact and stores the point identifier, value, and time in a new row of the sample table. In one embodiment, the load logic is configured to select the sample table having a name that corresponds to the point type and fact identifier for the fact being loaded. In one embodiment, the fact logic 110 and the load logic 120 are part of an extract, transform, load (ETL) layer of a database system.

The query logic 140 is configured to control processing of queries on the data in the data model. The query logic 140 accesses the metadata for sample tables relevant to a query. The metadata specifies whether ad hoc querying can be performed on a given sample table, whether only predetermined queries can be performed on the given sample table, or whether querying is not allowed on the given sample table. In this manner, the query logic 140 can prevent resource-intensive queries from being performed on sample tables that store high collection frequency facts (e.g., series or interval fact types) and avoid overloading system resources.

FIG. 5 illustrates one embodiment of a portion of the collection frequency based data model 130. The portion shown in FIG. 5 pertains only to electric meters in "Building A". Of course, most data models will include many different types of points and fact identifiers. The point table defines point specific attributes of each point of a given type. Each row of the point table describes a different meter. For example, the first row of the point table defines "Met001" as being a "meter" type point, assigns a more meaningful name "A_0_SW" to the point that can be interpreted by a user, and also includes a description of the point's location.

A fact table describes each fact (as identified by fact identifier) and maps one of the eleven fact types to each fact identifier. For each fact identifier, the fact table records the point type associated with the fact, the assigned fact type, the time basis of the fact, the category (e.g., static, series, or interval) of the fact, a more meaningful fact name, and a fact description. Three facts are shown in the fact table of FIG. 5, a daily reading of a meter's register, an ampere rating of a meter, and an hourly reading of the voltage measured by a meter.

The time basis for each fact identifier controls several aspects of the sample table that will store the metric data for the fact identifier. At instantiation, a sample table is created for a fact identifier based on the time basis for the fact identifier. Each sample table is given a name that describes the point type and fact identifier for the facts that it records. The sample table includes a column for the point identifier, the value of the metric data, and one or two columns for the time the metric data was taken. For example, the sample tables for daily register read collection (MTR_DAY_RR) and hourly meter voltage (MTR_HR_VOLT) have a single column that records the time at which the reading was taken while the sample table for the meter ampere reading (MTR_AMP) has two columns (i.e., start time and end time) to specify the valid time of the value. The end time will be derived according to metadata rules based on a change in the value or a time the data is accessed by a query (e.g., identified as "1/1/2050" in the cells of the sample table in FIG. 5).

The sample table metadata for each sample table stores rules for loading, processing, storing, and querying data in the sample table. The rules are derived based on the time basis of a facts in a given sample table. In FIG. 5, each sample table's metadata specifies a partition frequency that is based on the time basis and/or a level of query that is supported by the sample table based on the time basis. For example, the sample table for MTR_DAY_RR is for a fact having a time basis of daily. Based on this time basis, the sample table is assigned a partition frequency of "weekly" and a query level of "limited ad hoc" which means that only predetermined queries can by performed on the sample table.

Three sample tables that record the three different facts in the fact table are shown in FIG. 5. Of course, the data model 130 will include many sample tables, one for each point type/fact identifier combination.

Figure 6:
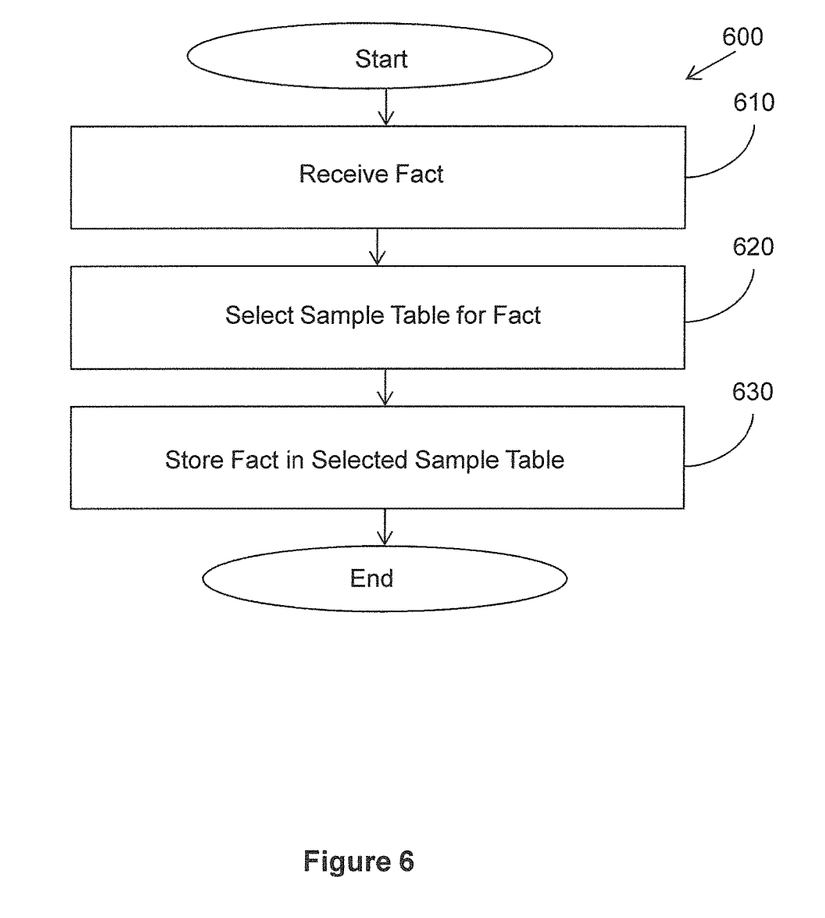
FIG. 6 illustrates one embodiment of a method associated with a collection frequency based data model.

FIG. 6 illustrates one embodiment of a method 600 that populates a collection frequency based data model. Various aspects of the method 600 maybe performed by the fact logic 110, the load logic 120, or the query logic 140 with respect to the data model 130 of FIG. 1. The method includes, at 610, receiving a fact that includes data corresponding to an attribute value for an attribute of a given point. At 620, the method includes selecting a table for storing the fact based, at least in part, the attribute and the point. At least one aspect of the selected table is determined based on a collection frequency according to which the data is collected. At 630, the method includes storing the fact in the selected table.

In one embodiment, the method 600 includes selecting a level of partitioning for the table based, at least in part, on the collection frequency for facts stored in the table.

In one embodiment, the method 600 includes controlling query access to the table based, at least in part, on the collection frequency for facts stored in the table.

In one embodiment, the point is an instantiation of a point type; the attribute has an associated fact identifier; and the table is a sample table configured to store facts for data having the same fact identifier and point type.

In one embodiment, the method 600 includes assigning the collection frequency comprises by determining a a fact type mapped to the point type and the fact identifier; and selecting a collection frequency that is mapped to the fact type.

In one embodiment, the attribute corresponds to a relationship and the attribute value corresponds to a different point that is related to the given point.

In one embodiment, the attribute corresponds to a status and the attribute value corresponds to a different point that describes a status of the given point.

As can be seen from the foregoing description, the collection frequency based data model is flexible enough to store a wide variety of facts. The highly structured nature of the data model supports high performance through careful design and control of all inputs. All aspects of the data model are designed to be fast and scalable while retaining flexibility.

Computer Embodiment

Figure 7:
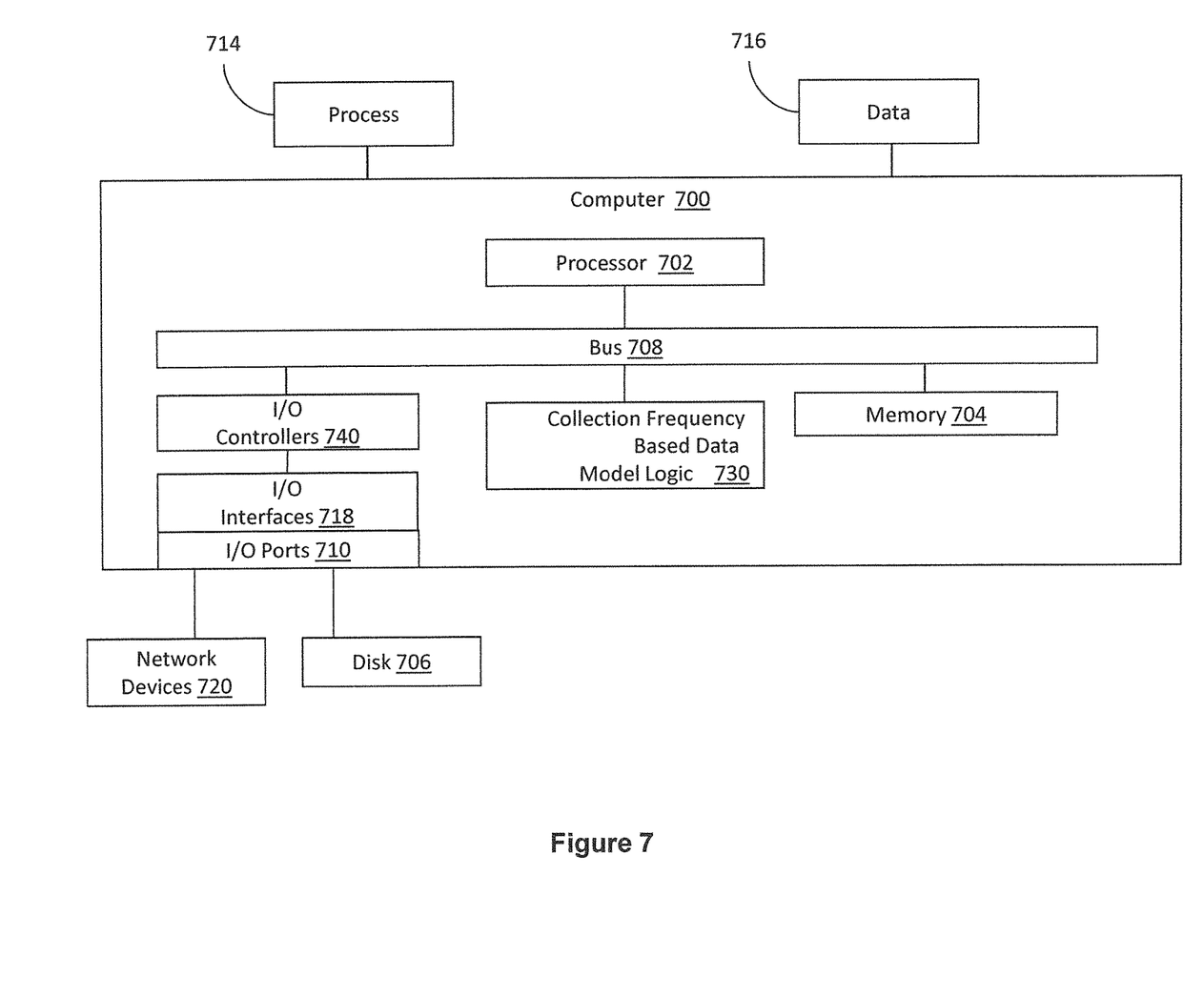
FIG. 7 illustrates an embodiment of a computing system configured with the example systems and/or methods disclosed.

FIG. 7 illustrates an example computing device that is configured and/or programmed with one or more of the example systems and methods described herein, and/or equivalents. The example computing device may be a computer 700 that includes a processor 702, a memory 704, and input/output ports 710 operably connected by a bus 708. In one example, the computer 700 includes collection frequency based data model logic 730 configured to create data structures and metadata to facilitate collection frequency based storage and processing of metric data. The collection frequency based data model logic 730 is similar to the system 100 described with respect to FIG. 1 and in some embodiments performs the method 600 of FIG. 6. In different examples, the collection frequency based data model logic 730 may be implemented in hardware, a non-transitory computer-readable medium with stored instructions, firmware, and/or combinations thereof. While the collection frequency based data model logic 730 is illustrated as a hardware component attached to the bus 708, it is to be appreciated that in one example, the collection frequency based data model logic 730 could be implemented in the processor 702.

In one embodiment, collection frequency based data model logic 730, or the computer is a means (e.g., hardware, non-transitory computer-readable medium, firmware) for performing the functions for facilitating collection frequency based storage and processing of metric data. as described with respect to FIGS. 1-6.

In one embodiment, collection frequency based data model logic 730 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on).

The means may be implemented, for example, as an application specific integrated circuit (ASIC) programmed to perform the functions described with respect to FIGS. 1-6. The means may also be implemented as stored computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multiprocessor architectures. A memory 704 may include volatile memory and/or non-volatile memory. Non-volatile memory may include, for example, read-only memory (ROM), programmable ROM (PROM), and so on. Volatile memory may include, for example, random access memory (RAM), static RAM (SRAM), dynamic RAM (DRAM), and so on.

A storage disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a compact disc-ROM (CD-ROM) drive, a CD recordable (CD-R) drive, a CD rewritable (CD-RW) drive, a digital video disk (DVD) ROM, and so on. The memory 704 can store a process 714 and/or a data 716, for example. The disk 706 and/or the memory 704 can store an operating system that controls and allocates resources of the computer 700.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and universal serial bus (USB) ports.

The computer 700 can operate in a network environment and thus may be connected to the network devices 720 via the input/output (I/O) interfaces 718, and/or the I/O ports 710. Through the network devices 720, the computer 700 may interact with a network. Through the network, the computer 700 may be logically connected to remote computers. Networks with which the computer 700 may interact include, but are not limited to, a local area network (LAN), a wide area network (WAN), and other networks.

In another embodiment, the described methods and/or their equivalents may be implemented with computer executable instructions. Thus, in one embodiment, a non-transitory computer storage medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable storage medium", as used herein, is a non-transitory medium that stores instructions and/or data configured to perform one or more of the disclosed functions. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other media with which a computer, a processor, or other electronic device can function. Each type of media, if selected for implementation in one embodiment, includes stored instructions of an algorithm configured to perform one or more of the disclosed functions. Computer-readable storage media described herein are limited to statutory subject matter under 35 U.S.C § 101.

"Logic", as used herein, includes a computer or electrical hardware, firmware, a non-transitory computer storage medium with stored instructions, and/or combinations of these configured to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, all of which are configured to perform one or more of the disclosed functions. Logic may include one or more gates, combinations of gates, or other circuit components configured to perform one or more of the disclosed functions. Where multiple logics are described, it may be possible to incorporate the multiple logics into one logic. Similarly, where a single logic unit is described, it may be possible to distribute that single logic unit between multiple logics. In one embodiment, one or more of these logics and corresponding structure associated with performing the disclosed and/or claimed functions. Choice of which type of logic to implement may be based on desired system conditions or specifications. Logic as described herein is limited to statutory subject matter under 35 U.S.C § 101.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable storage medium storing computer-executable instructions that when executed by a computer cause the computer to:
   identify a plurality of facts comprising at least a first fact and a second fact, wherein data for the first fact is to be collected at a first collection frequency that is greater than a second collection frequency at which data is to be collected for the second fact, wherein each of the plurality of facts corresponds to a given attribute of a given point type;
   determine the first collection frequency and the second collection frequency for the data to be collected for the plurality of facts;
   create data structures defining separate sample tables, the separate tables comprising a first table for storing the data collected for the first fact and a second table for storing the data collected for the second fact, where the separate sample tables record a point identifier, the data for the first fact and the second fact, and a collection time for the data;
   select different levels of partitioning for the separate sample tables based, at least in part, on the first collection frequency and the second collection frequency of the data for the plurality of facts;
   control query access to the separate sample tables that store data collected at the first collection frequency and the second collection frequency, and have the different levels of partitioning, wherein the query access is controlled by preventing performance of an ad hoc query on the first table that stores the data collected for the first fact and enabling performance of an ad hoc query on the second table that stores the data collected for the second fact; and
   store subsequently received data in the separate sample tables according to the different levels of partitioning selected for the separate sample tables based on the first collection frequency and the second collection frequency.

2. The non-transitory computer-readable medium of claim 1, where the computer-executable instructions further cause the computer to deduce a valid time for the data based on at least one of the first collection frequency and the second collection frequency.

3. The non-transitory computer-readable medium of claim 1, where the computer-executable instructions further cause the computer to:
   assign a unique fact identifier to each of the plurality of facts.

4. The non-transitory computer-readable medium of claim 1, where a given point type identified by the point identifier corresponds to a relationship and the data describes the relationship for the given point type.

5. The non-transitory computer-readable medium of claim 1, where a given point type corresponds to a status and the data describes the status of the given point type.

6. A computing system, comprising:
   at least one processor connected to at least one memory comprising a non-transitory computer readable medium;
   where the memory stores a data model configured to store data for a plurality of facts, the plurality of facts comprising at least a first fact and a second fact, where each of the plurality of facts corresponds to a given attribute of a given point type, and data for the first fact is to be collected at a first collection frequency and data for the second fact is to be collected at a second collection frequency, wherein the first collection frequency is greater than the second collection frequency;
   where the memory stores separate sample tables comprising a first table for the first fact and a second table for the second fact, where each of the separate sample tables records a point identifier, the data, and a collection time for the data;
   where the data model comprises sample table metadata that: (i) assigns different levels of partitioning to the separate sample tables, the different levels of partitioning being based, at least in part, on a difference between the first collection frequency and the second collection frequency, and (ii) controls query access to the separate sample tables storing data collected at the first collection frequency and the second collection frequency, the separate sample tables further having the different levels of partitioning, wherein controlling the query access prevents performance of an ad hoc query on the first table for storing the data collected for the first fact and enables performance of an ad hoc query on the second table for storing the data collected for the second fact; and where the memory stores load logic configured to, when executed by the at least one processor, cause the computing system to:

receive data for the plurality of facts; and store the received data received for the plurality of facts in the separate sample tables in accordance with the different levels of partitioning assigned to the separate sample tables based on the first collection frequency and the second collection frequency.

7. The computing system of claim 6, where a given point type identified by the point identifier corresponds to a status and the data describes the status of the given point type.

8. The computing system of claim 6, where a given point type identified by the point identifier corresponds to a relationship and the data is related to the given point type.

9. A computer-implemented method, comprising:

identifying a plurality of facts comprising at least a first fact and a second fact, wherein each of the plurality of facts corresponds to a given attribute of a given point type, and data for the first fact is to be collected at a first collection frequency and data for the second fact is to be collected at a second collection frequency, wherein the first collection frequency is greater than the second collection frequency;

determining the first collection frequency and the second collection frequency for the data to be collected for the plurality of facts;

creating data structures defining separate sample tables, the separate sample tables comprising a first table for storing the data collected for the first fact and a second table for storing the data collected for the second fact, where the separate sample tables record a point identifier, the data, and a collection time for the data;

selecting different levels of partitioning for the separate sample tables based, at least in part, on the first collection frequency and the second collection frequency of the data for the plurality of facts;

control query access to the separate sample tables that store the data collected at the first collection frequency and the second collection frequency, and have the different levels of partitioning, wherein controlling the query access: prevents performance of an ad hoc query on the first table for storing the data collected for the first fact and enables performance of an ad hoc query on the second table for storing the data collected for the second fact; and storing subsequently received data in the sample tables according to the different levels of partitioning selected for the separate sample tables based on the different collection frequencies.

10. The computer-implemented method of claim 9, further comprising deducing a valid time for the data based on the different collection frequencies.

11. The computer-implemented method of claim 9, further comprising:

assigning a unique fact identifier to the first fact and the second fact.

12. The computer-implemented method of claim 9, where a given point type identified by the point identifier for the data corresponds to a relationship and the data is related to the given point type.

13. The computer-implemented method of claim 9, where a given point type identified by the point identifier for the data corresponds to a status and the data describes the status of the given point type.

* * * * *

UNITED STATES PATENT AND TRADEMARK OFFICE
CERTIFICATE OF CORRECTION

PATENT NO. : 10,089,336 B2  
APPLICATION NO. : 14/578676  
DATED : October 2, 2018  
INVENTOR(S) : Van Den Handel, Jr. et al.

Page 1 of 1

It is certified that error appears in the above-identified patent and that said Letters Patent is hereby corrected as shown below:

In the Specification

Column 3, Line 22, delete "the the" and insert -- the --, therefor.

Column 7, Line 52, delete "by" and insert -- be --, therefor.

Column 7, Line 60, delete "maybe" and insert -- may be --, therefor.

Column 8, Line 14, delete "a a" and insert -- a --, therefor.

Column 8, Line 60, delete "data. as" and insert -- data as --, therefor.

Signed and Sealed this  
Seventh Day of January, 2020

Andrei Iancu  
*Director of the United States Patent and Trademark Office*